UNITED STATES PATENT OFFICE.

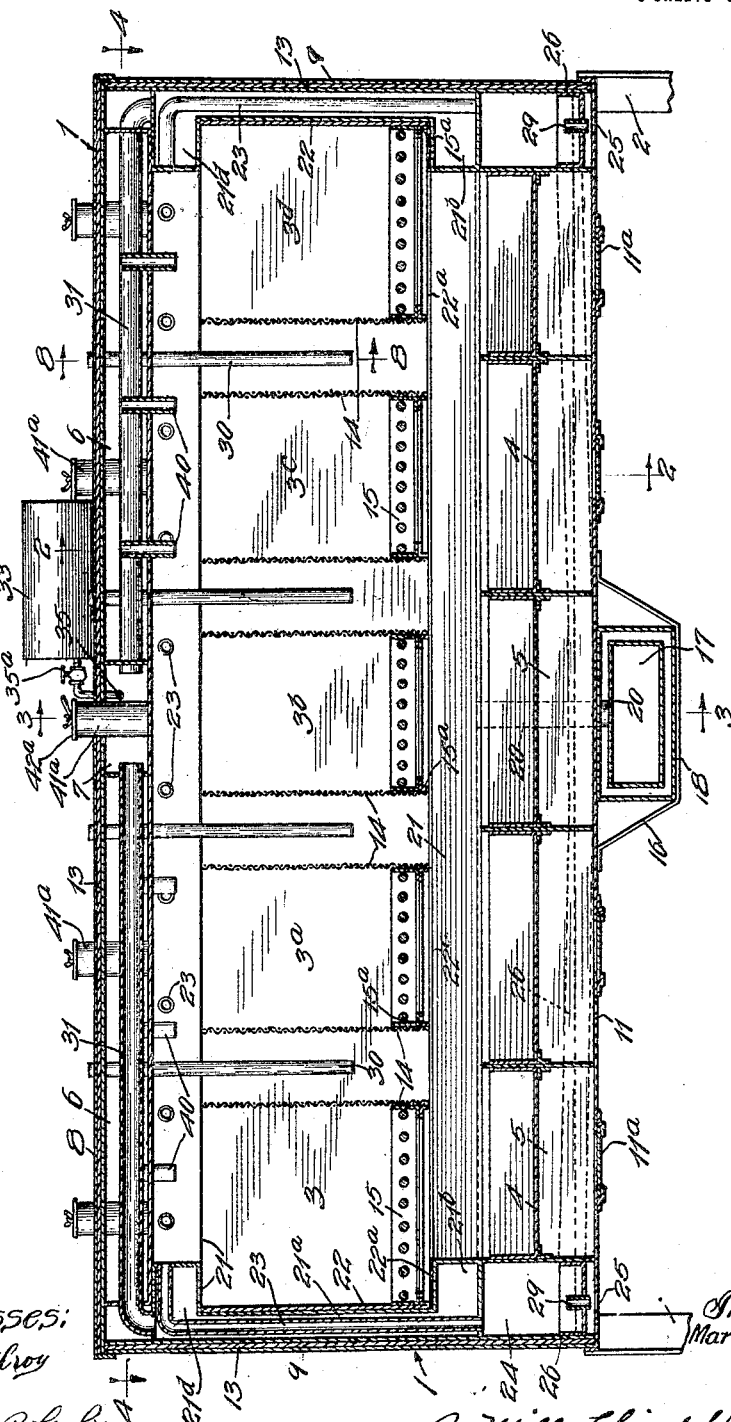

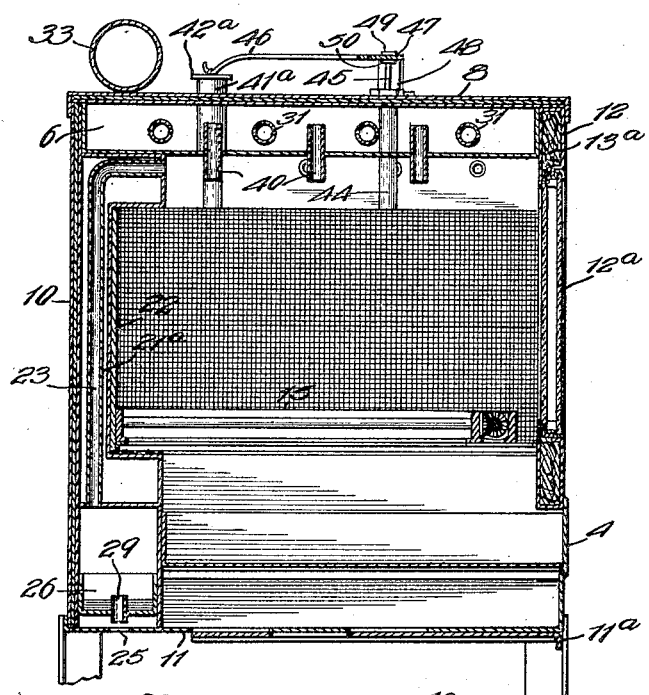
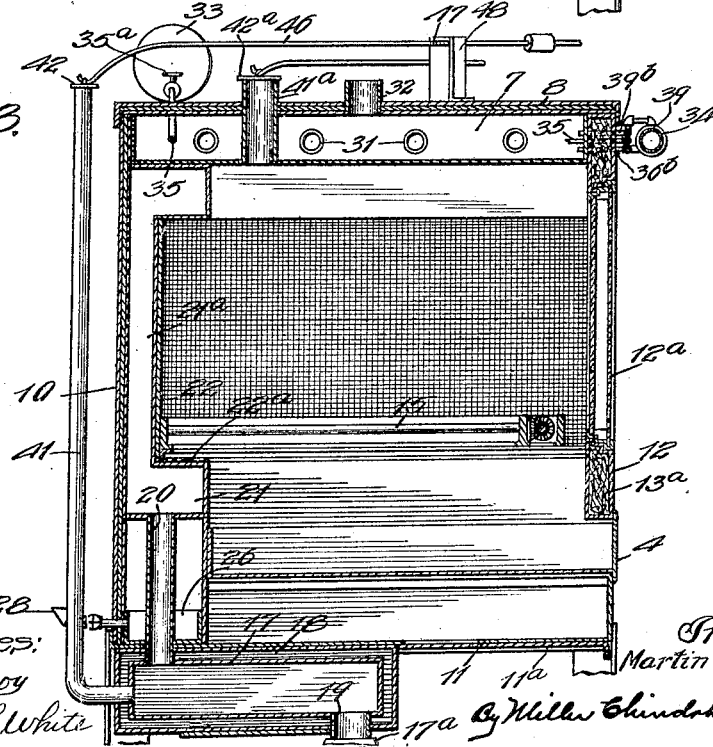

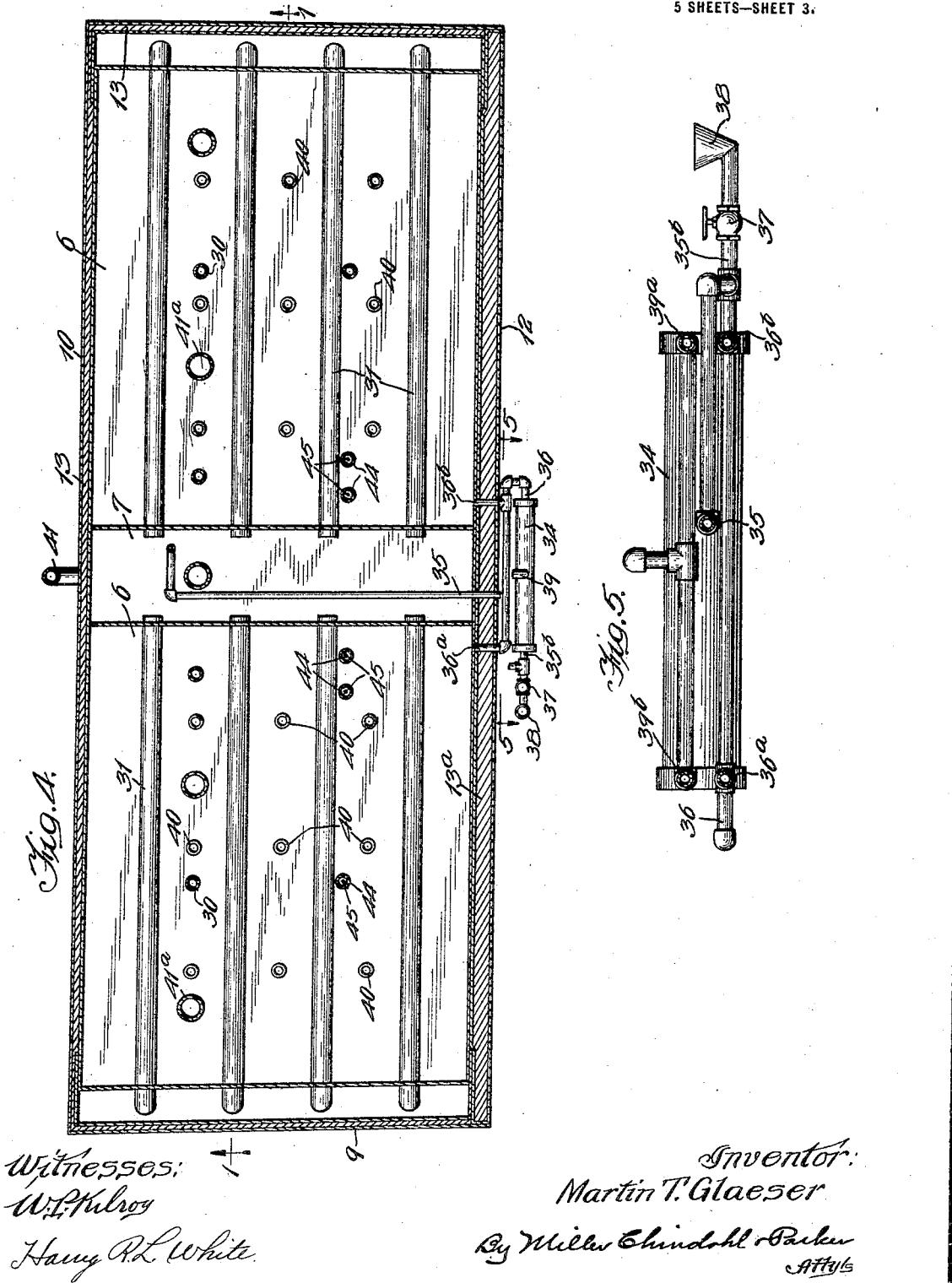

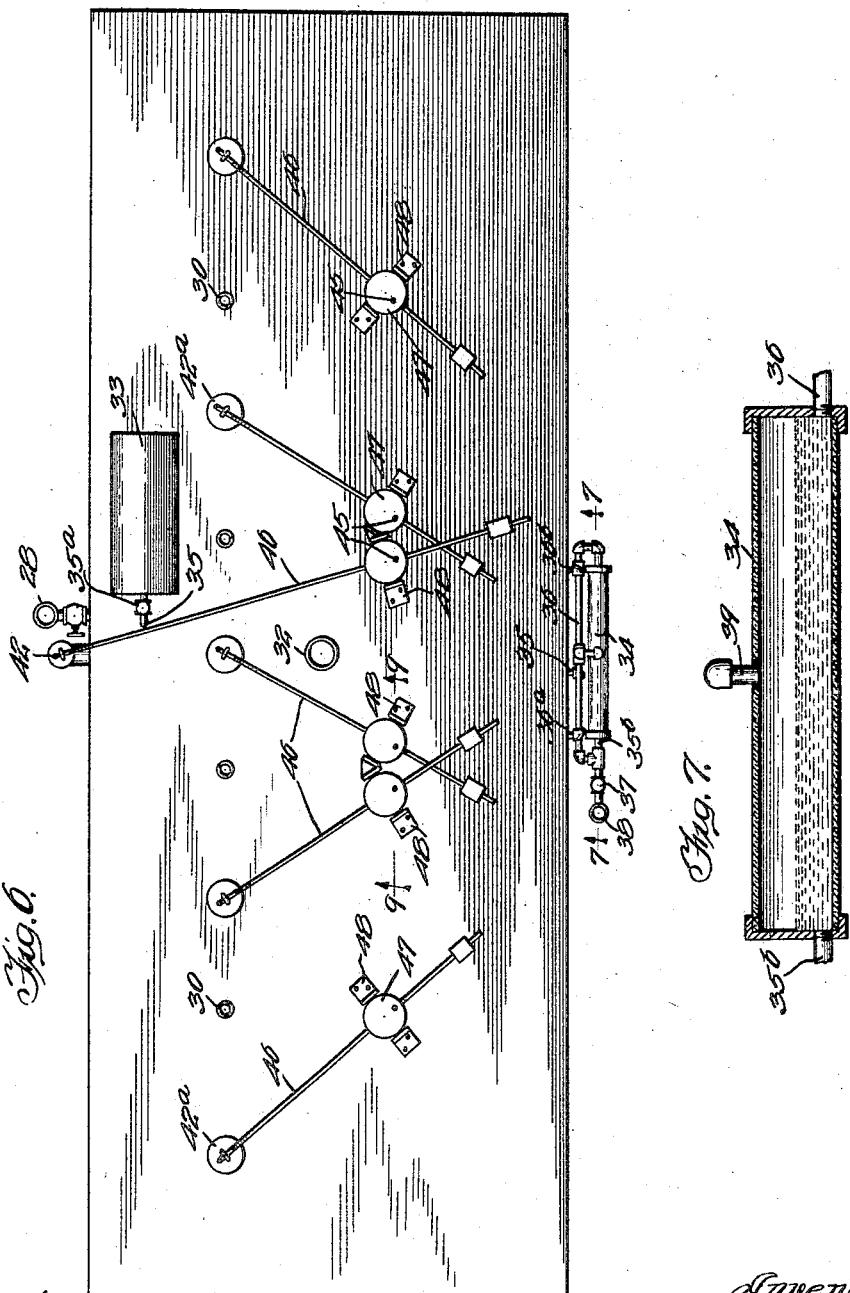

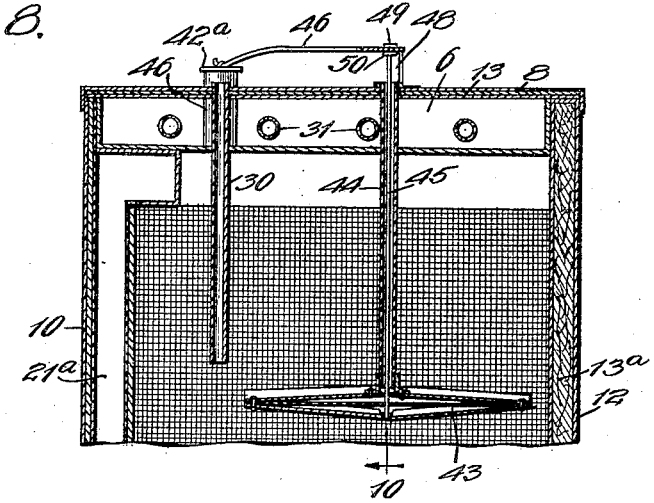
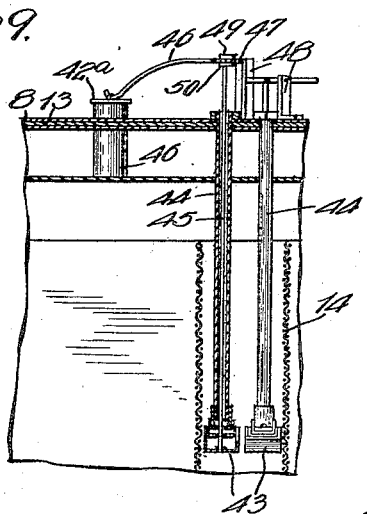
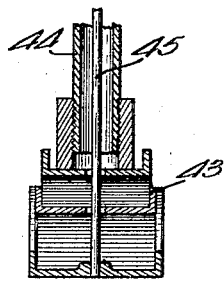
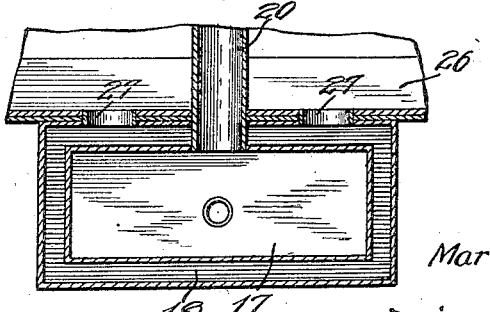

MARTIN T. GLAESER, OF CHICAGO, ILLINOIS.

INCUBATOR.

1,420,092.   Specification of Letters Patent.   Patented June 20, 1922.

Application filed June 3, 1918. Serial No. 237,390.

*To all whom it may concern:*

Be it known that I, MARTIN T. GLAESER, a citizen of the United States, residing at Chicago, in the county of Cook and State of Illinois, have invented certain new and useful Improvements in Incubators, of which the following is a specification.

The invention relates to poultry incubators, and the general object thereof is to produce an incubator of high efficiency.

More specifically, one object of the invention is to produce an incubator in which the air in the egg chamber may be maintained at a degree of humidity substantially uniform throughout the chamber.

A further object of the invention is to provide improved means for causing the air to circulate through the egg chamber.

Another object of the invention is to provide improved means for supplying warm moist air to the egg chamber.

A further object of the invention is to provide an egg chamber of relatively great capacity and means for maintaining therein a sufficient quantity of warm air at the proper degree of humidity.

Still another object of the invention is to provide improved means for automatically regulating the temperature in the egg chamber.

The objects of the invention thus generally stated, together with other and ancillary advantages, may be attained by the construction and arrangement illustrated in the accompanying drawings forming part hereof, in which Figure 1 is a vertical sectional view through an incubator embodying the features of my invention, the view being taken in the plane of line 1—1 of Fig. 4. Fig. 2 is a transverse sectional view through the incubator taken on line 2—2 of Fig. 1. Fig. 3 is a similar view taken on line 3—3 of Fig. 1. Fig. 4 is a horizontal sectional view taken on line 4—4 of Fig. 1. Fig. 5 is an enlarged sectional view of an indicating device taken in the plane of line 5—5 of Fig. 4. Fig. 6 is a top plan view of the incubator, showing the arrangement of the temperature controlling means. Fig. 7 is a fragmentary sectional view taken in the plane of line 7—7 of Fig. 6. Fig. 8 is a fragmentary transverse sectional view taken on line 8—8 of Fig. 1. Fig. 9 is a fragmentary longitudinal sectional view taken on line 9—9 of Fig. 6. Fig. 10 is an enlarged sectional view taken in the plane of dotted line 10 of Fig. 8. Fig. 11 is a sectional view through the rear end of the heater.

The incubator is preferably made in the form of a rectangualr case 1 mounted upon legs 2 and having therein: an egg chamber divided by means of suitable partitions into a plurality of separate compartments 3, $3^a$, $3^b$, $3^c$ and $3^d$; a chamber below the egg chamber for receiving the chicks from the latter, also divided into compartments corresponding in number to the compartments of the egg chamber and each having a drawer 4; below the chick chamber a ventilating chamber also divided into separate compartments 5; and above the egg chamber a pair of water containers or reservoirs 6 and an intermediate exhaust chamber 7.

The case 1 comprises a top wall 8, end walls 9, rear wall 10, bottom wall 11 and front wall 12, said walls being connected together in any preferred manner. The top, end, and rear walls are similarly formed of an inner and an outer metallic plate having a layer of insulating material 13 therebetween. The front wall is formed hollow, with a layer of insulating material $13^a$ therein, and is provided with a plurality of doors $12^a$, one for each compartment of the egg chamber, and also with a plurality of openings for receiving the chick drawers 4 below the egg chamber. The doors $12^a$ are preferably made with two panes of glass with an air space therebetween. The bottom wall 11 of the case forming the bottom of the ventilating chamber may be made in the form of a single metallic sheet, and below each of the compartments 5 of said chamber said wall is provided with a slide $11^a$ for controlling the admission of air into the chick chamber.

The partitions for dividing the egg chamber into the separate compartments 3, $3^a$, etc., preferably comprise two sheets of wire netting or screens 14 spaced apart and fastened at their forward and rear edges to the front and rear walls of the case. Said screens serve to support the egg trays 15, which may be of the type illustrated and described in my prior Patent No. 1,051,575, suitable angle irons $15^a$ being fastened to the screens near the lower edges thereof to form supporting ledges for the trays.

On the underside of the case 1, secured to the bottom wall 11 as by means of brackets 16, is a heater arranged to produce a water vapor. Said heater comprises an inner or heating chamber 17 and an outer or water chamber 18 (Figs. 1, 3 and 11). The inner chamber has an inlet pipe 19 at its forward end, opening into the bottom thereof and an outlet pipe 20 at its other end leading from the top thereof. Hot gases of combustion supplied from a suitable burner 17ª may thus be permitted to pass through the inner chamber, and while so passing to impart a portion of their heat to water contained in the outer chamber or jacket wholly surrounding the inner chamber.

The outlet pipe 20 leading from the top of the inner chamber of the heater opens at its upper end into a substantially U-shaped heat passageway or chamber 21 formed upon the inner sides of the end and rear walls 9 and 10 of the case and having an upright portion 21ª, a foot portion 21ᵇ and a header portion 21ᵈ. The inner wall of said upright portion 21ª forms the end and rear walls of the egg chamber, a layer 22 of suitable insulating material, such as compo-board, being preferably provided thereon. The foot portion 21ᵇ of said passageway extends inwardly a short distance from the end and rear walls below the egg chamber, and centrally of the rear wall receives the upper end of the pipe 20 (Figs. 1 and 3). Thus, the hot gases discharged from said pipe 20 travel upwardly and laterally toward the opposite ends of the egg chamber, and tend to heat the three sides thereof. Preferably the upper wall of the foot portion 21ᵇ of the passageway 21, immediately below the egg trays, is provided with a layer 22ª of insulating material.

The hot gases traveling upwardly through the passageway 21, in addition to imparting heat directly to the egg chamber, also impart heat to moist air or vapor passing therethrough by way of a series of pipes 23 discharging into the egg chamber through the header portion 21ᵈ of said passageway. The lower ends of said pipes 23 communicate with a cool-air chamber or channel 24 formed below the passageway 21. Said channel is made of a width substantially equal to that of the foot portion 21ᵇ of the passageway 21 and is arranged between the end and rear walls of the casing and the chick and ventilating chambers. The bottom wall 11 of the casing forms the bottom of said channel and said wall is provided with a plurality of openings 25 through which cool air is permitted to enter the channel, where it is mixed with warm vapor rising from a water container or evaporating pan in the form of a trough 26. Said trough is located near the bottom of the channel 24 and extends throughout the length thereof along the end and rear walls. This trough communicates substantially midway between its end with the water jacket 18 (Fig. 11) as by means of short pipe connections 27 passing through the bottom wall 11 of the case 1, and in the operation of the incubator a sufficient quantity of water is inserted into the trough as by means of a funnel 28 Fig. 3 having a valved pipe connection therewith. From the trough the water flows into the jacket 18 not only to completely fill the jacket, but also to partially fill the trough. Preferably the trough is inclined from its opposite ends downwardly toward the pipe connections 27 communicating with the water jacket, so that the water may always flow toward the water jacket. It will be seen that, as the water is heated by the hot gases passing through the inner chamber 17 of the heater, the hot water rises into the evaporating trough and the vapor rises from the trough into the mixing channel. As the water cools, it flows back into the jacket to be reheated.

The vapor rising from the trough 26 mixes with the cool air, entering the mixing channel 24 through the openings 25 in its bottom wall to form warm moist air, a series of tubular stems 29 being provided in the bottom of the trough to permit the air to pass therethrough. From the mixing chamber the warm moist air enters the lower ends of the pipes 23 which extend upwardly through the passageway 21, and as above stated, the moist air passing upwardly through the pipes 23 becomes heated by the hot gases passing upwardly through said passageway 21. Thus the moist air is discharged in a warm condition into the upper portion of the egg chamber, and since a plurality of inlet pipes 23 are provided at spaced intervals around the egg chamber, the incoming air is distributed substantially uniformly throughout the chamber.

The moist air thus admitted into the upper portion of the egg chamber slowly descends into the lower portion thereof and finally discharges from the egg chamber through vertical pipes 30 leading from a point near the bottom of the egg chamber to the atmosphere through the top wall 8 of the case 1. Preferably the pipes 30 are located in the spaces formed between the screens 14 of the partitions between the compartments of the egg chamber. In this position the pipes do not interfere with the insertion or removal of the egg trays 15 and at the same time cause the moist air to circulate through the egg chamber before exhausting.

In practice I have found that it is very desirable to employ an egg chamber of relatively great volume and to maintain therein a substantial quantity of moist air. The air thus maintained in the egg chamber furnishes oxygen to the eggs which tends to produce healthy chicks. Accordingly, in addition to the supply of warm moist air introduced by way of the pipes 29, I introduce into the egg chamber a supply of warm moist air, under pressure, the hot gases discharging from the upper portion of the passageway 21 being further utilized to create a warm vapor in the water containers or reservoirs 6 which vapor is mixed with air under pressure and carried into the upper portion of the egg chamber. To this end the hot gases from the passageway 21 are discharged through a series of pipes 31 leading upwardly from the header portion 21ᵈ of said passageway and thence horizontally through the water reservoirs 6 and finally into the exhaust chamber 7. The reservoirs 6 and the exhaust chamber 7 are suitably formed upon the underside of the top wall 8 of the case 1, the reservoirs being spaced apart to form the exhaust chamber therein. The bottom walls of the reservoirs and exhaust chamber thus form the top wall of the egg chamber. The pipes 31 extending through the reservoirs 6 are located near the bottoms thereof so as to pass through the water in the reservoirs and thus to impart to the water the heat of the hot gases passing therethrough. As shown in Figs. 3 and 6, the exhaust chamber 7 is provided with an exhaust pipe 32 located centrally thereof through which pipe the gases escaping from the pipes 31 discharge to the atmosphere.

It will be apparent that the warm gases thus passing through the pipes 31 in the reservoirs produce a warm vapor therein, and in order to introduce such vapor into the egg chamber I preferably employ air under pressure. Herein I have shown a tank 33 arranged to supply compressed air to a water glass or tube 34 Figs. 4 and 5 of ordinary construction, by way of a pipe 35 having a controlling valve 35ᵃ (Figs. 1, 3 and 6) and connected with a pipe 35ᵇ leading into one end of the tube 34. Said tube is preferably located along the upper forward edge of the case 1 and is also connected by means of a pipe 36 having suitable connections with pipes 36ᵃ and 36ᵇ communicating with the reservoirs 6. Thus, the tube 34 will indicate the level of the case 1 in a longitudinal direction as well as the height of the water in the reservoirs. In the air inlet pipe 35ᵇ there may be provided a valve 37 and a funnel 38 for use in supplying water to the reservoirs. The air admitted into the water tube through the pipe 35ᵇ escapes therefrom through a pipe 39 suitably connected with pipes 39ᵃ and 39ᵇ leading into the reservoirs, and it will be seen that the rate of flow of the air as evidenced by its passage in the form of bubbles through the water in the tube may be readily regulated by the valve 35ᵃ (Fig. 3). The air thus discharged into the reservoirs 6 mixes with the vapor created therein by the warm gases passing through the pipes 31, and the warm moist air thus formed passes, under the pressure of the incoming air, into the egg chamber through a plurality of tubular stems 40 in the bottoms of the reservoirs. At their upper ends said stems terminate a substantial distance above the bottoms of the reservoirs and at their lower ends below the outlet ends of the pipes 23.

It will be seen that the moist air from the reservoirs 6, by reason of the action of the incoming compressed air, travels relatively rapidly toward the bottom of the egg chamber, while the upper portion of the chamber is filled by the warm moist air discharging from the pipes 23 in a lateral direction and above the outlet ends of the pipes 40; and I have found in practice that by properly regulating the flow of compressed air by means of the valve 35ᵃ, the air in the egg chamber may be maintained at the proper degree of humidity substantially uniformly throughout the chamber.

The means for controlling the temperature of the egg chamber may comprise a series of thermostatically operated dampers. In Figs. 3 and 6 is shown a pipe 41 leading directly from the inner chamber 17 of the heater outwardly and upwardly to the upper rear edge of the case 1. Upon the upper edge of this pipe is provided a damper 42 arranged to normally close the pipe but adapted to be raised when the temperature in the egg chamber becomes excessive, to permit the hot gases to escape directly to the atmosphere instead of passing into the passageway 21 and imparting their heat to the egg chamber. Similarly a series of dampers 42ᵃ are arranged to normally close the upper ends of a series of exhaust pipes 41ᵃ one for each compartment and leading from the upper portion thereof through the top wall 8 of the case 1 to the atmosphere.

The means for operating the dampers 42 and 42ᵃ may be of any preferred and well-known construction. Herein such means comprises a series of thermostats 43 (Figs. 8 to 10) which are suspended as by means of pipes 44 within the partitions between the compartments 3, 3ᵃ, etc., of the egg chamber. Each of the thermostats 43 is connected with its damper by means of a rod 45 and a weighted lever 46. The lever has formed thereon a bearing plate 47 pivotally mounted between a pair of standards 48 and the upper end of said rod passes through said plate and has fixed thereon a washer or disc 49. Below the plate a nut 50 is threaded on the rod and spaced from the disk 49 to permit relative movement between the lever and the rod. The spaces within the partitions between the compartments are made sufficiently large to accommodate two thermostats when necessary (Fig. 9). The thermostats are preferably located substantially in the horizontal plane of the egg trays. It will be seen that when the heat in the egg chamber becomes excessive the thermostats 43 controlling the dampers 42 and 42ᵃ immediately cause the levers 46 to raise their dampers and thus to permit the exhaust of the hot gases directly from the heater as well as of the warm air from the egg chamber.

In the use of the incubator, the water jacket 18 of the heater is completely filled and the evaporating trough 26 partially filled with water, as by means of the funnel 28. Similarly water is entered by way of the funnel 38 and water glass 34 into the reservoirs 6, the water glass thus indicating not only the height of the water in the reservoirs but facilitating the operation of leveling the case 1 preliminary to setting the incubator in operation. Heat is then applied by means of the burner 20 to the heater and as the water becomes heated it rises into the evaporating trough 26 and gives off a vapor which mixes with cool air entering the mixing channel 24 through the openings 25 therein. The hot gases pass upwardly from the heater through the pipe 20 into the passageway 21, and then pass upwardly and laterally in said passageway so as to heat the end and rear walls of the egg chamber. The moist air formed in the mixing channel by the vapor rising from the trough 26 and the air entering through the openings 25 passes upwardly through the pipes 23 leading through the passageway 21 and is warmed by the hot gases surrounding said pipes before it is discharged into the upper portion of the egg chamber.

From the upper end of the passageway 21 the hot gases enter the pipes 31 extending horizontally through the reservoirs 6, and while passing through said pipes to the exhaust chamber 7 the gases serve to warm the water in the reservoirs. The warm vapor which is thus produced mixes with air introduced under pressure from the tank 33, the air being first passed through the water glass 34 where it absorbs a certain amount of moisture. As the pressure in the reservoir is built up by the incoming air, the warm moist air in the upper portions of the reservoir is gradually forced downwardly through the tubular stems 40 and passes relatively rapidly to the lower portion of the egg chamber. The warm moist air thus introduced by way of the pipes 23 and stems 40 completely fills the egg chamber and gradually escapes to the atmosphere through the pipes 30 leading from near the bottom of the egg chamber. The rate of flow of air under pressure into the reservoirs, as indicated by its passage through the water glass, may be readily regulated by means of the valve 35ª, so that not only may the amount of air introduced into the egg chamber be varied at will but the degree of humidity may also be varied since with a decrease or increase in the amount of air introduced there is necessarily a decrease or increase in the amount of moisture introduced from the reservoirs.

Should the temperature of the egg chamber become too great in any portion of the egg chamber, the thermostats 43 affected automatically raise their dampers 42ª and permit the overheated air in the egg chamber to exhaust, at, or about the same time the damper 42 is raised, by its thermostat, from off the pipe 41 so that the hot gases are permitted to escape to the atmosphere directly from the heater. Thus the air in the egg chamber is uniformly maintained throughout at the proper temperature.

While I have herein illustrated and described my invention with considerable particularity it will be understood that I do not intend to be limited in the interpretation of the following claims except as may be necessitated by the state of the prior art.

I claim as my invention:

1. An incubator having, in combination, an egg chamber with an outlet, a chick chamber below the egg chamber, a passageway around the egg chamber, a heater below the chick chamber for supplying heat to said passageway and comprising a water chamber, a channel below the heat passageway, a trough in said channel and communicating centrally thereof with said water chamber of the heater, the opposite ends of said trough being raised slightly above the central portion thereof, means for admitting air into said channel to mix with the vapor rising from said trough, and means for conducting the moist air thus formed through the heat passageway into the egg chamber.

2. An incubator having, in combination, an egg chamber with an outlet, said chamber having a plurality of upright side walls forming a passageway around the egg chamber, a channel below and extending along and adjacent to said passageway, means for supplying a water vapor to said channel, said means including a heater, means for admitting air to said channel to mix with the vapor therein, said heater being adapted to supply heat to the lower portion of said passageway, and means for conducting the moist air from the channel through said passageway and into the upper portion of the egg chamber.

3. An incubator having, in combination, an egg chamber provided with an outlet, means for producing moist air, means for conducting the moist air to the egg chamber, said means including a plurality of pipes connected with the producing means and opening laterally into the egg chamber at spaced intervals around a plurality of sides of said chamber, a heater, and a passageway for hot gases from the heater enclosing said pipes and surrounding the egg chamber.

4. An incubator having, in combination, an egg chamber provided with an outlet, a passageway formed in a plurality of upright hollow side walls of said egg chamber, an air chamber below and extending along adjacent to said passageway, a plurality of pipes spaced apart and leading from the air chamber through the passageway into the egg chamber, and means for supplying moist air to said air chamber including a heater connected with said passageway so that the hot gases of combustion from the heater enter said passageway.

5. An incubator having, in combination, an egg chamber provided with an outlet, a passageway formed in a plurality of upright hollow side walls of said egg chamber, an air chamber below and extending along adjacent to said passageway, means for supplying warm moist air to the air chamber including a heater having a water chamber and a heating chamber, said heating chamber being connected with said passageway to heat it, and means passing through said passageway for conducting the moist air from the air chamber to the egg chamber.

6. An incubator having, in combination, an egg chamber provided with an outlet, a passageway formed in a plurality of upright hollow side walls of said egg chamber, an air chamber below extending along beside said passageway, an evaporating pan opening directly into said air chamber, a plurality of pipes leading from the air chamber through said passageway into the egg chamber, and means for heating water in said pan and supplying heat to said passageway.

7. An incubator having, in combination, an egg chamber provided with an outlet, a passageway formed in a plurality of upright hollow side walls of said egg chamber, an evaporating pan directly under said passageway, a plurality of air inlet tubes protruding upwardly in said pan, means for heating the water in said pan and supplying heat to said passageway, and means passing through said passageway for conducting the moist air formed above said pan to the egg chamber.

8. An incubator having, in combination, an egg chamber with an outlet, a chick chamber below the egg chamber, a passageway formed in a plurality of upright hollow side walls of the egg chamber, an air chamber below said passageway and extending substantially throughout the length thereof, means for supplying vapor to said air chamber and heat to said passageway, and means passing through said passageway for conducting moist air from the air chamber to said egg chamber.

9. An incubator comprising an egg chamber having hollow side walls, a water reservoir above the egg chamber having a plurality of pipes projecting upwardly above the surface of the water therein and downwardly into the egg chamber a distance somewhat below the top wall thereof, means for heating the water in the reservoir and means for conducting warm moist air to the egg chamber comprising a plurality of pipes discharging substantially horizontally into the egg chamber above the lower ends of the first mentioned pipes.

10. An incubator having an egg chamber, means for supplying warm vapor to the egg chamber including a plurality of pipes extending downwardly in the upper portion of the egg chamber and terminating a short distance below the top wall thereof, and means for supplying warm moist air to the egg chamber comprising a plurality of pipes having their discharge ends horizontally arranged in the upper portion of the egg chamber above the lower ends of the first mentioned pipes.

11. An incubator comprising, in combination, a case providing an egg chamber, a plurality of upright air pipes spaced apart at various sides of the case and opening into the upper portion of the egg chamber at different sides thereof, an upright passageway entirely enclosing said pipes, and means including a heater for supplying warm moist air to said air pipes and hot gases to said passageway.

12. An incubator comprising, in combination, a case providing an egg chamber, a plurality of upright air pipes spaced apart and opening into the upper portion of the egg chamber, an upright passageway enclosing said pipes, means including a heater for supplying warm moist air to said air pipes and hot gases to said passageway, and means heated by the hot gases discharged from said passageway for supplying an additional quantity of warm moist air to the egg chamber.

13. An incubator having, in combination, an egg chamber, means for supplying warm moist air to the lower portion of the egg chamber comprising an inlet tube depending and discharging downwardly into the upper portion of the egg chamber, and means for supplying warm moist air to the upper portion of the egg chamber comprising a tube discharging laterally into the upper portion of the egg chamber and above the outlet of the tube of the first mentioned means.

14. An incubator comprising, in combination, a case providing an egg chamber and a closed moisture chamber adapted to contain a quantity of water, a series of horizontal pipes passing through said closed chamber, a heater, means for conducting hot gases from the heater to said series of pipes, means for introducing air under pressure to said chamber, and a plurality of pipes adapted to discharge warm moist air formed in the moisture chamber to the egg chamber.

15. An incubator having, in combination, an egg chamber provided with an outlet and having a hollow wall providing an upright passageway, a series of conductors for moist air passing through said passageway and opening into the egg chamber, a closed chamber above the egg chamber arranged to contain a quantity of water and having a plurality of pipes passing therethrough, a heater, means for conducting hot gases from the heater through said passageway and into said pipes, and means for discharging the vapor produced in the closed chamber to the egg chamber.

16. An incubator comprising, in combination, a case providing an egg chamber and a closed moisture chamber, an evaporating pan in the lower portion of the case, a heater arranged to heat water in said pan, means for admitting air to the space above the pan, means for conducting the mixture of air and vapor to the egg chamber, and means for conducting hot gases through the closed chamber to heat water contained therein, said closed chamber having discharge pipes opening into the egg chamber, and the means for conducting the hot gases to said closed chamber being adapted to heat the mixture of air and vapor passing to the egg chamber from said evaporating pan.

17. An incubator comprising a case providing an egg chamber, an evaporating pan in the lower portion of the case below the egg chamber, a closed chamber above the egg chamber, a heater adapted to heat the water in the evaporating pan, means for conducting the mixture of air and vapor formed above the first evaporating pan to the egg chamber, means for conducting hot gases from the heater through the closed chamber to heat water therein, means for admitting a variable quantity of air under pressure to said closed chamber, and discharge pipes leading from the closed chamber to the egg chamber.

18. An incubator comprising, in combination, a casing, a passageway around the casing, means including a heater for producing a quantity of warm moist air, means passing through said passageway for conducting the warm moist air to the upper portion of the egg chamber, said heater being arranged to discharged hot gases into said passageway, an exhaust pipe leading from the upper portion of the egg chamber, a thermostatically operated damper for controlling said exhaust pipe, and an outlet pipe of relatively restricted diameter leading from the lower portion of the egg chamber and arranged to induce a constant circulation of air through the chamber.

19. A incubator having, in combination, an egg chamber of substantial length, a plurality of foraminated partitions dividing the egg chamber into inter-communicating compartments, means for introducing warm moist air into each of said compartments, means for permitting the gradual escape of air from said compartments, an exhaust pipe for each of said compartments, a damper normally closing each of said pipes, and a plurality of thermostats for said dampers located within said partitions.

In testimony whereof, I have hereunto set my hand.

MARTIN T. GLAESER.